(12) United States Patent
Kruse

(10) Patent No.: US 7,551,316 B2
(45) Date of Patent: Jun. 23, 2009

(54) PRESENTATION PRINT JOB PROFILING

(75) Inventor: Patricia S. Kruse, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1729 days.

(21) Appl. No.: 09/929,430

(22) Filed: Aug. 13, 2001

(65) Prior Publication Data

US 2003/0030823 A1   Feb. 13, 2003

(51) Int. Cl.
*G06F 15/00* (2006.01)
(52) U.S. Cl. ............... 358/1.6; 358/1.13; 358/1.14; 358/1.15; 358/1.18; 358/451; 358/452; 399/1; 399/8; 399/45; 399/382; 715/208
(58) Field of Classification Search ............ 358/1.6, 358/1.13, 1.14, 1.15, 1.18, 451, 452; 399/1, 399/8, 45, 382; 715/208
See application file for complete search history.

(56) References Cited

U.S. PATENT DOCUMENTS

| | | | | |
|---|---|---|---|---|
| 5,442,732 A * | 8/1995 | Matysek et al. | ............ | 358/1.17 |
| 5,481,353 A * | 1/1996 | Hicks et al. | ............... | 399/382 |
| 5,579,087 A * | 11/1996 | Salgado | ..................... | 399/1 |
| 6,026,416 A * | 2/2000 | Kanerva et al. | ............ | 715/515 |
| 6,393,231 B2 * | 5/2002 | Okawa et al. | .................. | 399/81 |
| 6,674,540 B1 * | 1/2004 | Wiechers et al. | ........... | 358/1.15 |
| 2003/0103237 A1 * | 6/2003 | Han | ....................... | 358/1.18 |

* cited by examiner

*Primary Examiner*—David K Moore
*Assistant Examiner*—Mark R Milia (57) ABSTRACT

The described subject matter provides a convenient way to organize and automate a presentation printing process by defining a presentation print job profile. To accomplish this, a user adds a plurality of files to a presentation profile. The user specifies packaging and printing characteristics with respect to individual ones of the files. Responsive to a single print request, each of the files in the presentation profile is printed based on the specified packaging and printing characteristics.

32 Claims, 7 Drawing Sheets

| PRESENTATION PRINT JOB PROFILE - MONTHLY FINANCIAL REPORT | | | | | | _ X |
|---|---|---|---|---|---|---|
| NEW | OPEN | ADD | EXTRACT | OPTIONS | PRINT | ... |
| NAME | | | TYPE | | | ... |
| JUNE SALES | | | POWERPOINT FILE | | | 502 |
| INTRODUCTION<br>MORNING SESSION HNDOUT<br>AFTERNOON SESSION HNDOUT<br>SPEAKER NOTES | | | MICROSOFT POWERPOINT<br>MICROSOFT WORD<br>COREL WORDPERFECT<br>MICROSOFT POWERPOINT | | | |

PRESENTATION PRINT JOB PROFILING

TECHNICAL FIELD

The described subject matter relates to printing files.

BACKGROUND

The amount of information being generated worldwide in business and research activities is growing at a staggering rate. Sharing this information with others can be extremely valuable. For instance, tightening competitive environments and global economic trends are forcing businesses and entire industries to search for a means to gain an advantage. This advantage can be realized through the use of past knowledge relating to their business or organization—allowing better and more timely decisions, leading to a better understanding of their business and support for their customers, that ultimately leads to growth. However, before information can be disseminated to others, it must generally be analyzed and organized into a report, or presentation.

Even after information that is to be presented in the report has been analyzed and organized, a substantial amount of time typically goes into producing a presentation-quality report. This is because presentations typically include a number of different components such as written material for audience distribution, overhead transparencies for projector display, speaker notes, and so on. These different components are often generated using various computer program applications (e.g., word processing applications, slide presentation applications, and the like) from various data sources. To print these different components, each component must typically be printed—file-by-file, using the particular application that generated the file, and then assembled into at least one complete package that can be taken to a copy center for reproduction.

For example, consider that a daylong presentation includes a meeting agenda, morning and afternoon session written materials, slides, and speaker notes. Consider that the meeting agenda and the written materials for the morning session need to be printed using a particular word processor (e.g., Microsoft Word®) on A4 size paper. The written materials for the afternoon session need to be printed using a different word processor (e.g., Corel WordPerfect®), on standard (8½×11) paper print media. A single copy of slides needs to be printed on overhead transparency print media (e.g., plastic sheets) using a slide presentation application such as Microsoft PowerPoint. The speaker notes, which were generated with the same application that was used to generate the slides, need to be printed on paper print media.

In this example, a user needs to manually coordinate printing the presentation by: (a) using various word processing applications; (b) a slide presentation application; and, (c) configuring the various word processing applications and/or the printer at appropriate times to access particular media supply trays to accommodate the various types of print media required (i.e., A4 and standard sized paper, and plastic overhead transparencies). Thus, producing even a single copy of a presentation-quality report is typically a time-consuming and burdensome process. To make matters worse, consider that this time consuming procedure may need to be performed at periodic time intervals if the report is updated on a regular basis (e.g., weekly financial reports, status reports, and so on).

Accordingly, the following described subject matter addresses these and other problems of printing material for presentation.

SUMMARY

The described subject matter provides a convenient way to organize and automate a presentation printing process by defining a presentation print job profile. To accomplish this, a user adds a plurality of files to a presentation print job profile. The user specifies packaging and printing characteristics with respect to individual ones of the files. Responsive to a single print request, each of the files in the presentation profile is printed based on the specified packaging and printing characteristics.

To specify the packaging characteristics the user identifies: (a) individual ones of the files that are not included in a general distribution package; (b) one or more options (e.g., stapling, collating, etc.) to identify how at least one subset of the files are packaged; (c) how many copies to print with respect to particular ones of the files that are for general audience distribution; and/or (d) how many copies to print with respect to particular ones of the files that are independent of other files that are for general audience distribution. To specify the printing options, the user indicates a specific printer to print each of the files, and/or which of multiple print media supply bins are to be used by the printer to print individual ones of the files.

BRIEF DESCRIPTION OF THE DRAWINGS

The same numbers are used throughout the drawings to reference like features and components.

DETAILED DESCRIPTION

Overview

The following described subject matter provides a convenient way to organize and automate a presentation printing process by defining a presentation print job profile. A user interface (UI) provides for specifying the characteristics/requirements of the print job with respect to substantially each aspect of the presentation printing process. A user instantiates the UI from a number of "presentation print job profile" menu items located on the desktop display of an operating system.

A number of dialog boxes in the UI allow the user to specify a presentation print job profile name, and identify the following: (a) each file in the presentation; (b) those files of the specified files that are not for general distribution to an audience (e.g., slides and speaker notes); (c) how to package (e.g., staple, collate, etc.) the files for general distribution (hereinafter, the files for general distribution are often referred to as the "distribution package"); (d) the number of copies of the distribution package that are required; (e) the particular printer to use for printing; and, (f) the respective print media supply bins of the printer to use with respect to particular ones of the files.

Since a presentation print job profile indicates whether a file should be included in a distribution package or printed separately, overhead transparencies, speaker notes, and the like, are printed in a manner that is independent not only of the quantities of the other files being printed, but also printed independent of any distribution packages that are to be circulated to an audience.

Responsive to a user selecting a presentation print job profile to print, for each file in the print job profile, the described subject matter instantiates the particular application that was used to create the file (e.g. Microsoft Word®, PowerPoint®, and so on) to print the file according to the information provided in the print job profile.

Accordingly, the described subject matter presents a simple and convenient technique to define a presentation print job profile to print each of the files included in a presentation.

Exemplary User Interface

Figure 1:
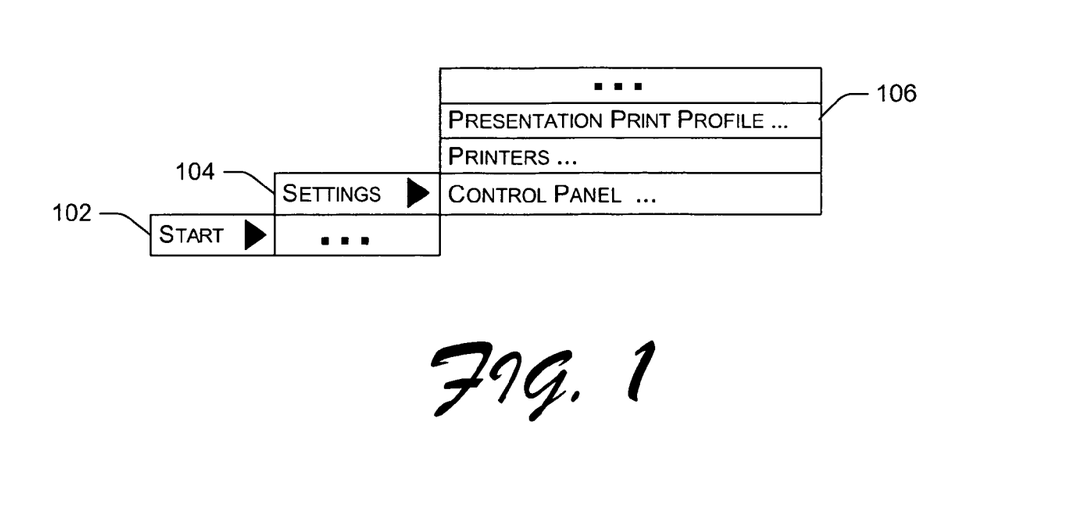
FIG. 1 is a block diagram that shows a series of exemplary menu items that allow a user to access a presentation print job profile computer application to create and manage a presentation print job profile, and to print a presentation that is based on the print job profile.

FIG. 1 shows a series of exemplary menu items that allow a user to access a presentation print job profile computer application to create and manage a presentation print job profile, and print a presentation that is based on the presentation print job profile. In this example, a presentation print job profile menu item 106 is initially activated from the start 102 and the setting's 104 menu items that are displayed on a desktop of an operating system such as a Microsoft WINDOWS 2000 operating system. The functions of the presentation print job profile menu item can be incorporated into a UI in many other ways other than from the desktop of an operating system, such as through a presentation print job profile facility that is accessed through the operating system's control panel window, through programmed function keys on an input device (e.g., a keyboard, mouse, etc.), through a voice recognition software application, and so on.

Figure 2:
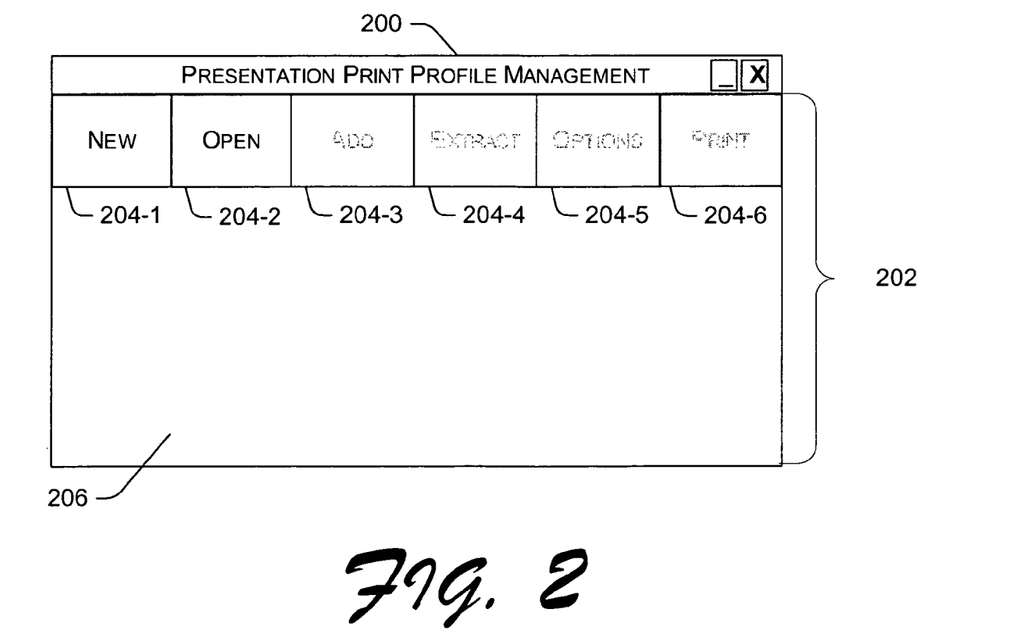
FIG. 2 is a block diagram that shows an exemplary user interface of a presentation print job profile computer application window to create and manage a presentation print job profile, as well as to print a presentation that is based on the presentation print job profile.

FIG. 2 is an exemplary UI of a presentation print job profile computer application window 200 to create and manage a presentation print job profile, as well as to print a presentation that is based on the presentation print job profile. The application window includes a working area 202 that includes a number of button controls 204 and a presentation area 206. The new profile control 204-1, upon selection, presents a dialog box (see, the dialog box 300 of FIG. 3) for generating a new presentation print job profile.

The open button control 204-2, upon selection, presents a dialog box (see, the dialog box 700 of FIG. 7) that allows a user to open an existing presentation print job profile. The add button control 204-3, upon selection, presents an add file dialog box (see, the dialog box 400 of FIG. 4) that allows the user to add a particular file to a print job profile. The extract control 204-4 provides for removing a file that has already been added to a presentation from the presentation's print job profile.

The options control 204-5, upon selection, presents a print options dialog box (see, the dialog box 600 of FIG. 5) that allows the user to specify both printer and general distribution package specific options as well as file-by-file specific printing options. The printer and general distribution package specific options provide an opportunity to specify: (a) the particular printer to use for printing the files in the presentation; (b) the number of copies of the distribution package that are required; and, (c) how to package (e.g., staple, collate, etc.) the files for general distribution.

The file-by-file specific printing options allow the user to indicate on a file-by file-basis: (a) whether particular ones of the files in the presentation (e.g., slides and speaker notes) should be printed independent of the files that are for general distribution (e.g., not stapled into a general distribution package, in a number of copies that are different from the number of copies of the files for general distribution, and so on); and, (b) the respective print media supply bins of the specified printer to use with respect to particular ones of the files.

Figure 3:
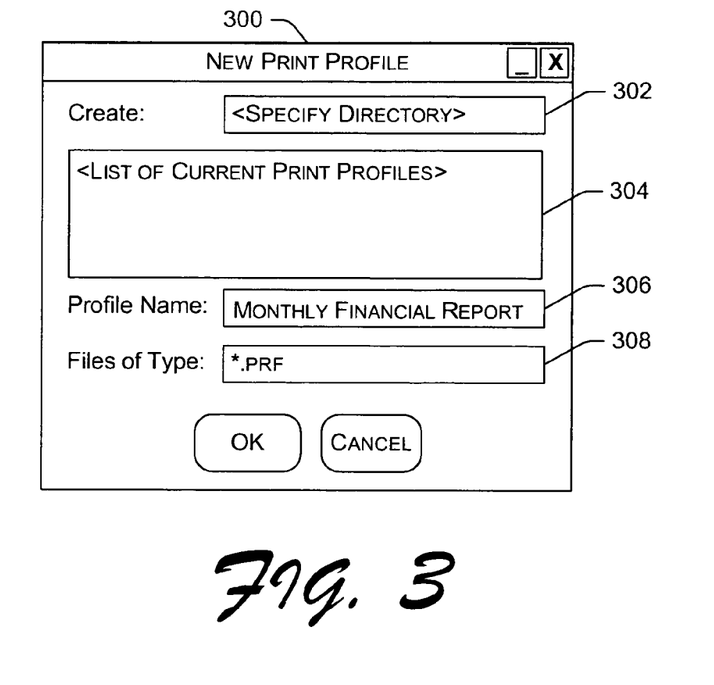
FIG. 3 is a block diagram that shows an exemplary dialog box to generate a new presentation print job profile.

FIG. 3 is a block diagram that shows an exemplary dialog box 300 to generate a new presentation print job profile. The user can specify the particular directory within which to create the profile (i.e., file name text box 302), as well as the specific name of the profile (i.e., input control 306). Presentation window 304 shows any files in the specified directory having the file type specified in file type input control 308. In this example, the print job profile has a particular extension ".prf", however, the profile extension could be any arbitrary extension. Responsive to selecting the OK button control, an add file dialog box (see, dialog box 400 of FIG. 4) is displayed.

Figure 4:
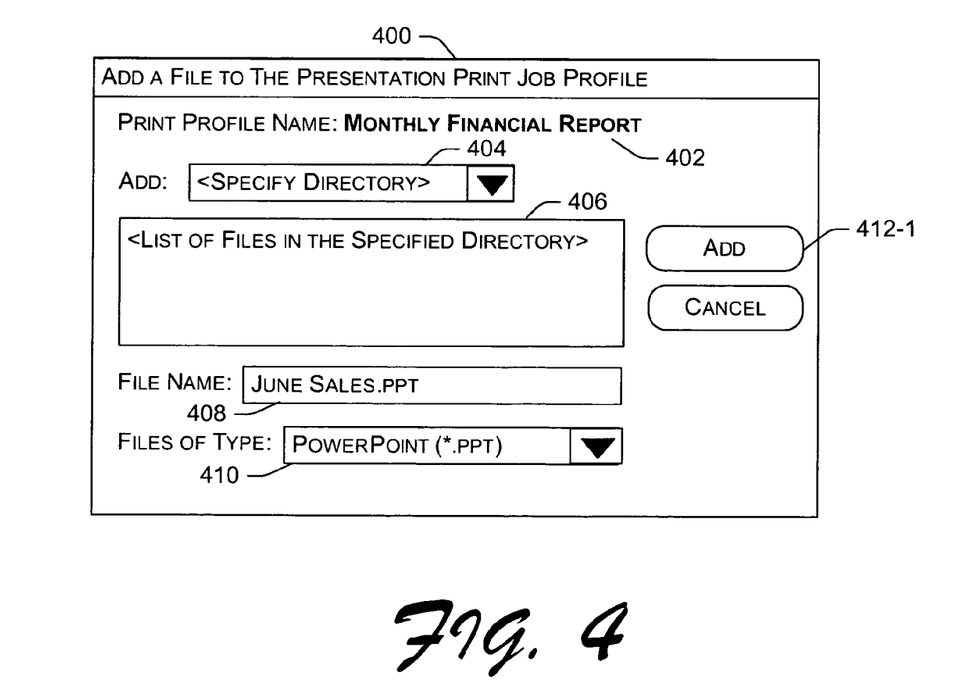
FIG. 4 is a block diagram that shows an exemplary dialog box to add a file to a presentation print job profile.

FIG. 4 is a block diagram that shows an exemplary dialog box 400 to add a file to a presentation print job profile. The name of the particular presentation print job profile being edited is identified in label area 402. Dropdown menu control 404 is available for the user to identify a particular directory to look for a file to add to the profile. List area 406 indicates the files (if any) that can be added to the profile. File name input area 408 provides a text editing area for the user to input a file name to add to the profile. Dropdown menu control 410 provides for the user to select a certain file type to display in the file name presentation window 406.

If the user either selects a file that is displayed in the presentation window 406 (e.g., by using a pointing device to select a file name in the presentation window), or inputs the name of the file into edit control 408, the add button control 412-1 is activated for user selection. (An activated button is a button that can receive user input. Active buttons are illustrated with black text, such as the add button control. A deactivated button is not available for user selection. Deactivated buttons are shown with gray text. A control is deactivated when a particular context state of the dialog box does not provide the control with a valid action.) Upon inputting/selecting a file name and selecting the add button, the file is added to the profile and displayed in the presentation print job profile window 200 as shown below in FIG. 5.

Figure 5:
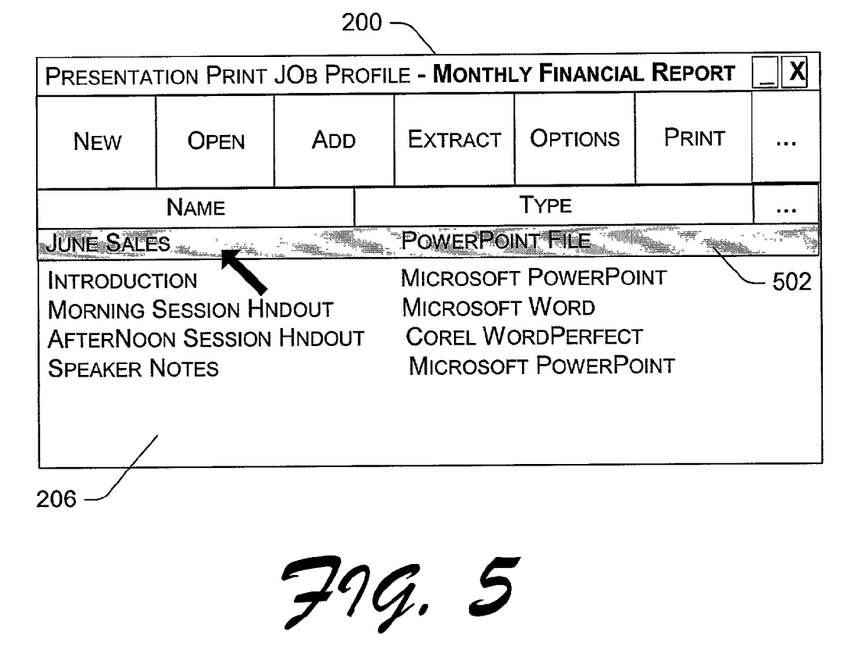
FIG. 5 shows further aspects of an exemplary presentation print job profile computer application window of FIG. 2 to create and manage a presentation print job profile, as well as to print a presentation based on a selected presentation print job profile.

FIG. 5 shows further aspects of an exemplary presentation print job profile computer application window 200 (see also, FIG. 2) to create and manage a presentation print job profile as well as to print a presentation based on a selected presentation print job profile. In particular, the UI illustrates that files "June Sales" (see, the user input file name 408 of FIG. 4), "Introduction", "Morning Session Handout", "Afternoon Session Handout", and "Speaker Notes" are included in the presentation's print job profile. To remove a file from the print job profile, a user selects a file (e.g., as illustrated by the highlighted area 502), then selects the "Extract" button control. To set options for the presentation the user selects the "Options" control. To print each of the files in the print job profile, the user selects the "Print" button control.

Note that adjacent to each file in area 206 has an indication of the type, or name of the program that was used to create the file. E.g., the file June Sales is shown to have been created using Microsoft (MS) PowerPoint®, the Morning Session Handout is shown to have been generated with MS Word®, and so on. When a file is generated with a particular computer program application, the application typically provides a file extension to the name of the file when it is saved to identify the file as a type that should accessed (e.g., printed) with the particular program.

E.g., a PowerPoint file corresponds to the ".ppt" extension, a Word file corresponds to the ".doc" extension, a WordPerfect file corresponds to the ".wpd" extension, and so on. In this manner, the type of each file in area 206 is determined for display. Moreover, in this manner the type of each file is available for the presentation print job profile application (i.e., see program file 818 of FIG. 8) to automatically instantiate the programs used to print the files in the presentation print job profile. Operating systems generally provide some means to create different mappings other than those that may have been provided by a computer program application.

Figure 6:
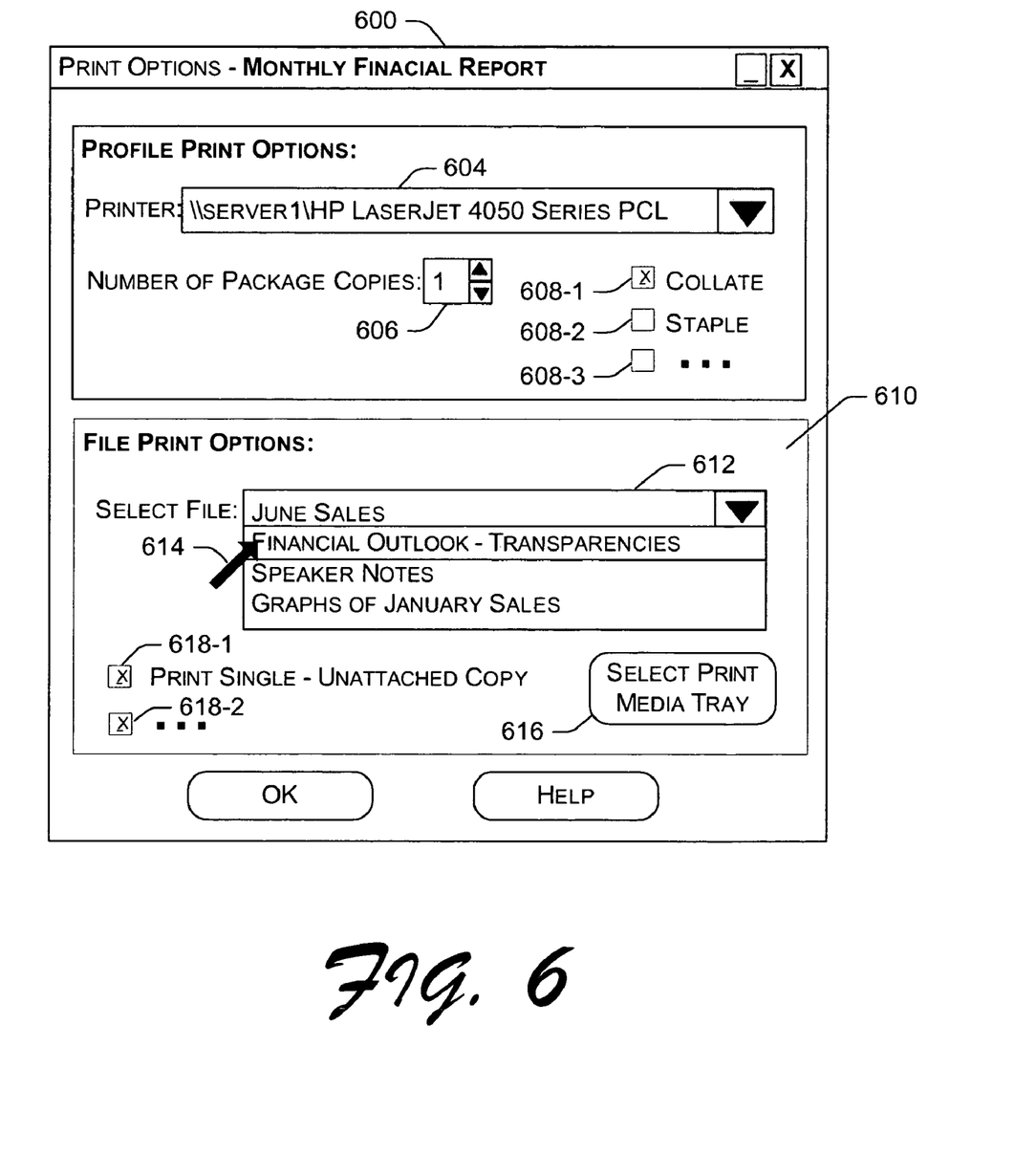
FIG. 6 is a block diagram that shows an exemplary dialog box to configure the presentation print job profile's various printing options.

FIG. 6 is a block diagram that shows an exemplary dialog box 600 to configure the presentation print job profile's various printing options. When a new profile is generated, the system selects a default printer such as Hewlett Packard's LaserJet 4050 Series PCL printer. The user, however, can override this default by selecting a different printer. Drop-down menu control 604 provides means to specify the particular printer to use to print the files in a presentation print job profile. The spin control 606 provides means for a user to indicate the number of copies of the presentation to print. Radio controls 608 allow the user to select printer packaging options (e.g., staple and/or collate) for each copy of the printed report.

Certain files in the presentation may not be for general audience distribution such as slides, speaker notes, and so on. Additionally, certain files may need to be printed on specific print media (e.g., plastic print media) that is different from the print media of other files in the print job.

Accordingly, area 610 includes a select file dropdown menu 612 for selecting a file from the files in the presentation print job profile. A user selects the radio control 618-1 to indicate that a single copy of the selected file should be printed separately and not included in a report package (e.g., stapled with the other files). Thus, report materials such as overhead transparencies, speaker notes, and the like, can be printed independently not only of the number of copies of the other files being printed, but also independent of any presentation packages that are to be physically distributed to an audience.

Although not shown, the print file options area 610 could include a spin button control (e.g., control 606) for a user to select the number of copies of the selected file that need to be printed.

Moreover, the select print media tray button 616, provides a dialog box (not shown) with a list of the printer's (see, printer designation 604) media supply bins that can be used to print the selected file. In this example, the user has selected a file called "financial outlook—transparencies", as shown by the cursor 614 on top of the highlighted area. Thus, the user would likely select a media supply bin that is loaded with overhead transparency print media.

Figure 7:
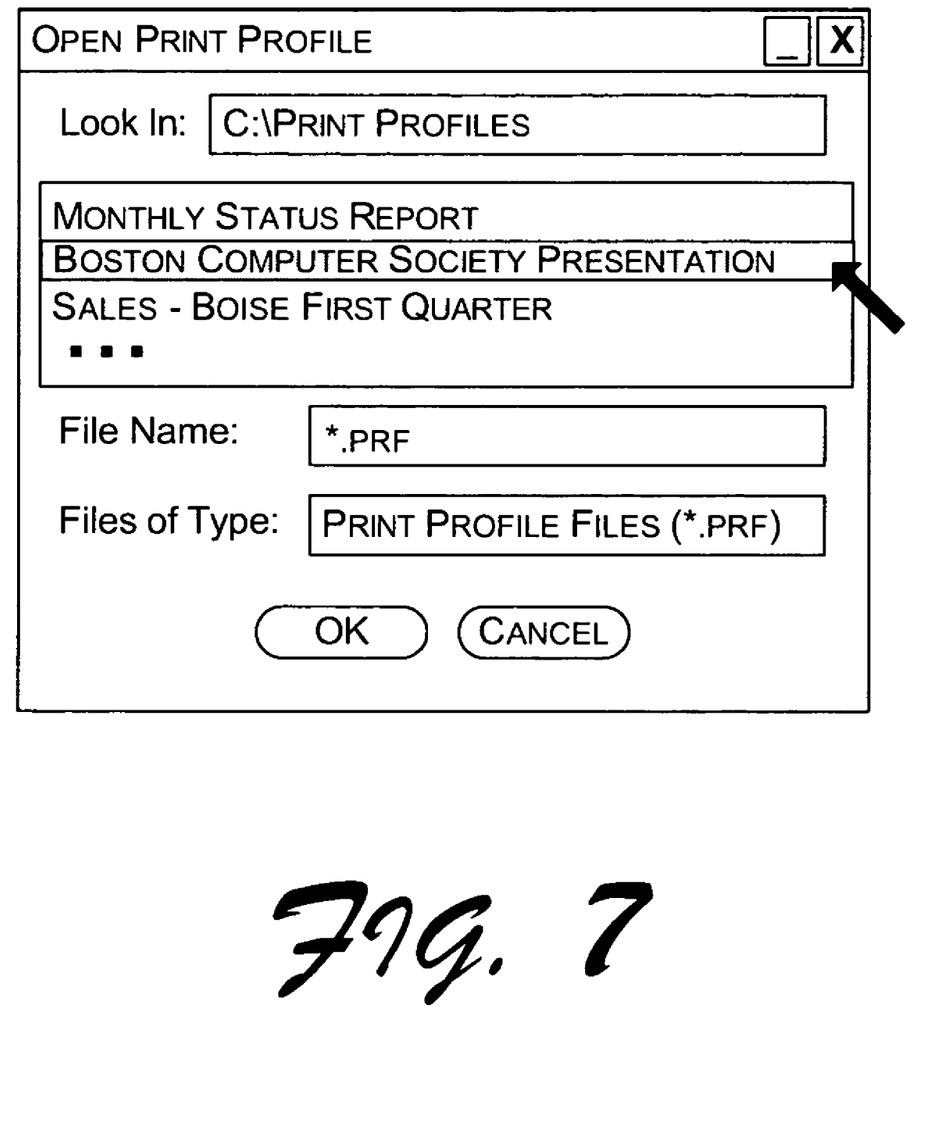
FIG. 7 is a block diagram of an exemplary dialog box to open an existing presentation print job profile.

FIG. 7 is a block diagram of an exemplary dialog box to open an existing presentation print job profile. The system displays the dialog box in response to user selection of an open presentation print job profile button control (e.g., control 204-5 of FIG. 2).

Exemplary System for Providing a Presentation Print Job Profile

Figure 8:
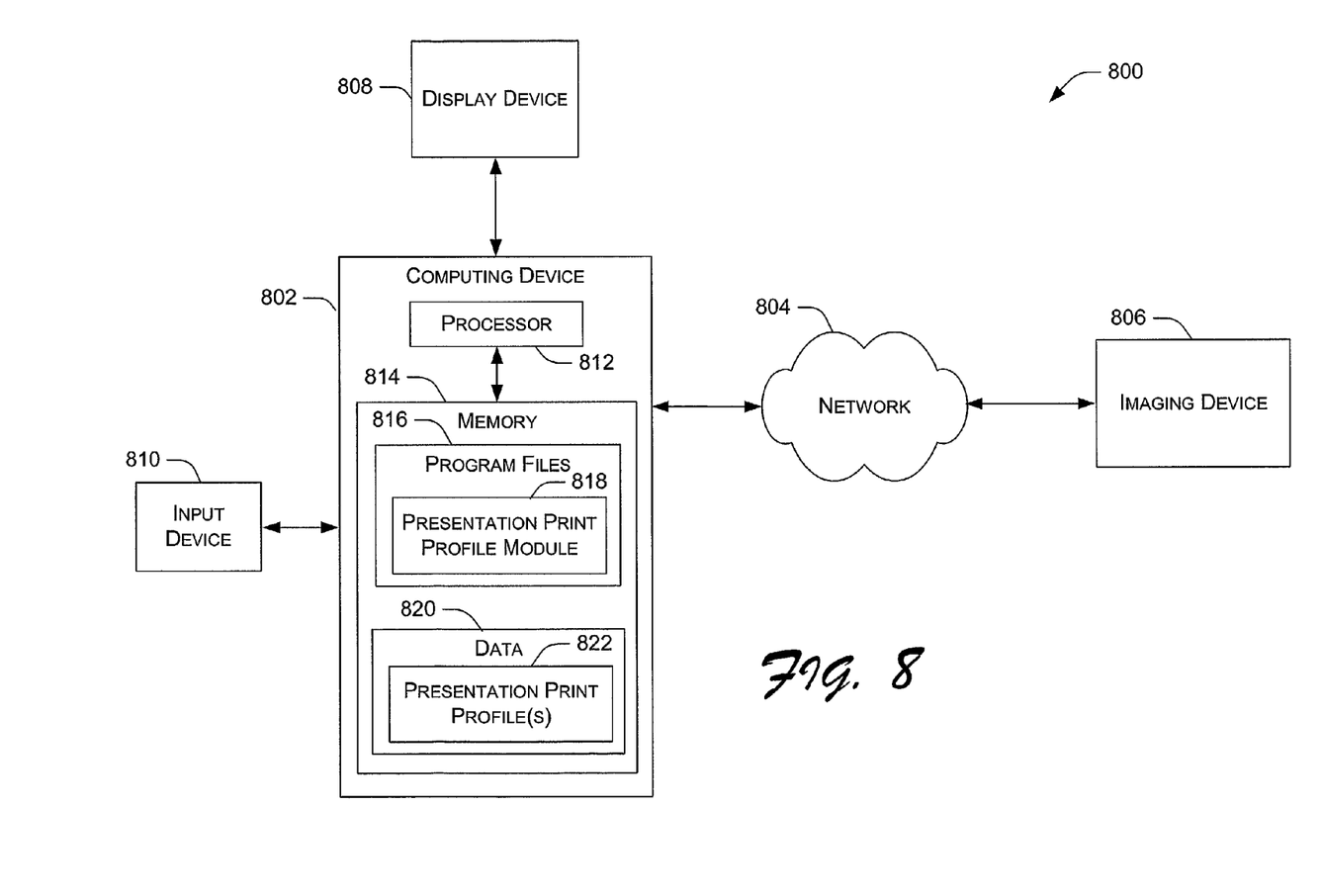
FIG. 8 is a block diagram that shows an exemplary system 800 to provide a convenient way to organize and automate a presentation printing process by defining a presentation print job profile.

FIG. 8 is a block diagram that shows an exemplary system 800 to provide a convenient way to organize and automate a presentation printing process by defining a presentation print job profile. A host device 802 is operatively coupled across a communication medium 804 to an imaging device 806. The host device is implemented as a personal computer (PC), server, Web Server, or other device configured to communicate with image forming devices. The host device is operatively coupled to a display device 808 (e.g., a CRT, flat-panel monitor, etc.) to display UI components (i.e., those described above with respect to FIGS. 1 through 7, which provide for specifying the characteristics, or requirements of substantially each aspect of a presentation's printing process).

A user enters commands and information into computer 802 through the input device 810 (e.g., a keyboard, a microphone, pointing devices such as a "mouse", etc.).

The communication medium 804 is a parallel connection, a packet switched network (e.g., an organizational intranet network), the Internet, and/or other communication configurations that provide electronic exchange of information between the host device 802 and the image forming device 806 using an appropriate protocol (e.g., TCP/IP, UDP, SOAP, etc.). Other system arrangements are possible including additional host devices and/or additional image forming devices coupled to the communication medium.

The host computer 802 includes a processor 812 that is coupled to a system memory 814. The system memory includes any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory card, a CD-ROM, and/or the like.

The processor 812 is configured to fetch and execute computer program instructions from application programs 816 such as an operating system, a presentation print job profile configuration module 818, and the like. The processor is also configured to fetch data 820 (e.g., presentation print job data 822) while executing the application programs.

The image forming device 806 is configured to form images upon print media (e.g., paper, envelopes, transparencies, labels, etc.). (Different types of print media have various weights, surface finishes, roughness, wicking properties, etc., which impact equality of images formed thereupon by the imaging device). One exemplary image-forming device is a printer, such as a laser printer, inkjet printer, a dot matrix printer, a dry medium printer, or a plotter. The described subject matter is embodied within other image forming device configurations such as multiple function peripheral devices, copiers, facsimile machines, plotters, and so on. The imaging device includes one or more print media supply bins (not shown), or trays into which various print media are loaded.

The subject matter is illustrated in FIG. 8 as being implemented in a suitable computing environment. Although not required, the subject matter is described in the general context of computer-executable instructions, such as a program module 818 that is executed by the host device 802. Program modules typically include routines, programs, objects, components, data structures, and the like, that perform particular tasks or implement particular abstract data types. Moreover, those skilled in the art will appreciate that the invention may be practiced with other computer system configurations, including multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices (computer-readable media).

Exemplary Procedure

Figure 9:
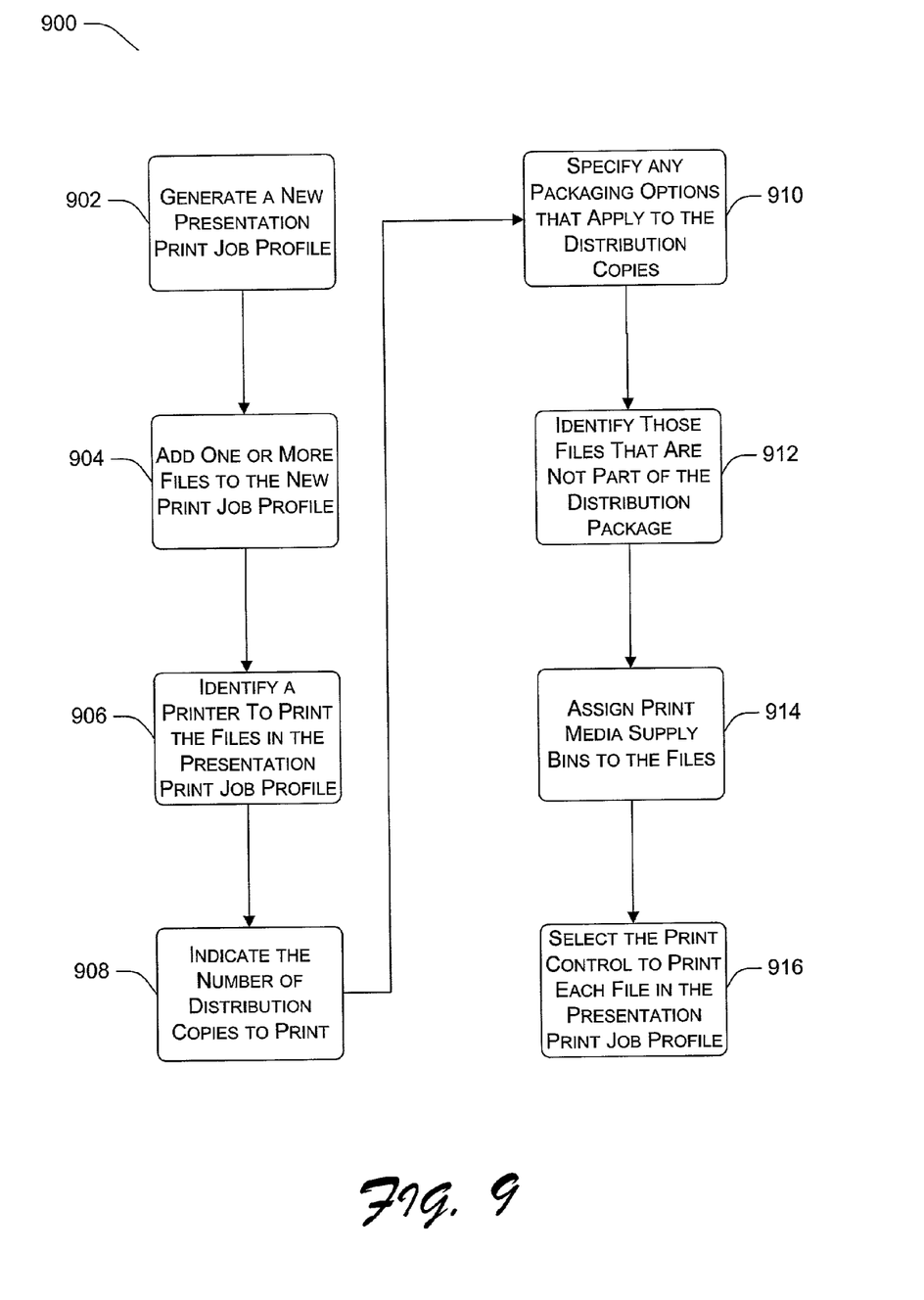
FIG. 9 is shows an exemplary procedure 900 to organize and automate a presentation printing process by defining a presentation print job profile.

FIG. 9 is shows an exemplary procedure 900 to organize and automate a presentation printing process by defining a presentation print job profile. At block 902, the user generates a print job profile by providing a name of the print job profile. Since the profile was just created it will not include any files. At block 904, the user adds one or more files to the generated profile. At block 906, the user identifies the printer that is associated with the print job profile. (Block 906 is optional if a default printer has already been designated that satisfies the printing needs of the presentation print job profile).

At block 908, the user indicates the number of distribution copies of the presentation that are needed. At block 910, the user selects any packaging options (e.g., staple, collate, etc.) that apply to the distribution copies. At block 912, the user identifies those files, if any, that are not for general distribution by indicating that only a single copy of the file is to be printed unattached to the distribution copies. At block 914, the user assigns a particular print media supply bin of the printer (see, block 906) to any file that needs to be printed on a different print media as compared to other files in the presentation. At block 916, the user prints the files in the presentation by selecting the print option (e.g., the print button 204-6 of FIG. 2).

CONCLUSION

Although the subject matter has been described in language specific to structural features and/or methodological steps, it is to be understood that the subject matter defined in the appended claims is not necessarily limited to the specific features or steps described. Rather, the specific features and steps are disclosed as preferred forms of implementing the claimed subject matter.

The invention claimed is:

1. A method comprising:
   adding a plurality of files to a presentation profile;
   specifying a set of individual printing characteristics with respect to each of the files;
   specifying a set of individual packaging Characteristics with respect to each of the files; and
   responsive to a single print request, printing a presentation package including each of the files in the presentation profile based on the individual packaging characteristics and individual printing characteristics corresponding to each of the files.

2. A method as recited in claim 1, wherein a first subset of the files were generated using a first computer program application, and wherein a second subset of the files were generated using a second computer program application that is different than the first computer program application.

3. A method as recited in claim 1, wherein specifying the packaging characteristics further comprises:
   identifying a first subset of the files that are to be included in the presentation package and a second subset of the files that are to be included in a general distribution package, wherein the second subset of files is different than the first subset of files.

4. A method as recited in claim 1, wherein specifying the packaging characteristics further comprises;
   selecting one or more options to identify how at least one subset of the files of the presentation package are packaged, the one or more options comprising stapling the at least one subset of files together and collating the at least one subset of files.

5. A method as recited in claim 1, wherein specifying the packaging characteristics further comprises:
   identifying a subset of files that are to be included in a general distribution package; and
   indicating a number of copies to print with respect to the subset of the files that are to be included in the general distribution package.

6. A method as recited in claim 1, wherein specifying the packaging characteristics further comprises:
   indicating a number of copies to print with respect to a subset of the files that are to be included in the presentation package.

7. A method as recited in claim 1, wherein specifying the printing characteristics further comprises:
   identifying a specific printer to print each of the files.

8. A method as recited in claim 1, wherein specifying the printing characteristics further comprises:
   indicating which of a plurality of print media supply bins are to be used by a printer to print individual ones of the files.

9. A computer-readable medium comprising computer-executable instructions to print a plurality of files in a presentation, the computer-executable instructions comprising instructions for:
   adding a plurality of files to a presentation profile;
   specifying a set of individual printing characteristics with respect to each of the files;
   specifying a set of individual packaging characteristics with respect to each of the files; and
   responsive to a single print request, printing a presentation package including each of the files in the presentation profile based on the individual packaging characteristics and individual printing characteristics corresponding to each of the files.

10. A computer-readable medium as recited in claim 9, wherein a first subset of the files were generated using a first computer program application, and wherein a second subset of the files were generated using a second computer program application that is different than the first computer program application.

11. A computer-readable medium as recited in claim 9, wherein the instructions for specifying the packaging characteristics further comprising instructions for:
   identifying a first subset of the files that are to be included in the presentation package and a second subset of the files that are to be included in a general distribution package, wherein the second subset of files is different than the first subset of files.

12. A computer-readable medium as recited in claim 9, wherein the instructions for specifying the packaging characteristics further comprising instructions for:

selecting one or more options to identify how at least one subset of the files of the presentation package are packaged, the one or more options comprising stapling the at least one subset of files together and collating the at least one subset of files.

13. A computer-readable medium as recited in claim 9, wherein the instructions for specifying the packaging characteristics further comprising instructions for:
identifying a subset of files that are to be included in a general distribution package; and
indicating a number of copies to print with respect to the subset of the files that are to be included in the general distribution package.

14. A computer-readable medium as recited in claim 9, wherein the instructions for specifying the packaging characteristics further comprising instructions for:
indicating a number of copies to print with respect to at least a first subset of the files that are independent of at least a second subset of the files that are to be included in the presentation package.

15. A computer-readable medium as recited in claim 9, wherein the instructions for specifying the printing characteristics further comprising instructions for:
identifying a specific printer to print each of the files.

16. A computer-readable medium as recited in claim 9, wherein the instructions for specifying the printing characteristics further comprising instructions for:
indicating which of a plurality of print media supply bins are to be used by a printer to print individual ones of the files.

17. A computing device comprising:
a memory comprising computer-executable instructions for automatically printing each file in a presentation profile;
a processor that is operatively coupled to the memory, the processor being configured to fetch and execute the computer-executable instructions from the memory, the computer-executable instructions comprising instructions for:
adding a plurality of files to a presentation profile;
specifying a set of individual printing characteristics with respect to each of the files;
specifying a set of individual packaging characteristics with respect to each of the files; and
responsive to a single print request, printing a presentation package including each of the files in the presentation profile based on the individual packaging characteristics and individual printing characteristics corresponding to each of the files.

18. A computing device as recited in claim 17, wherein a first subset of the files were generated using a first computer program application, and wherein a second subset of the files were generated using a second computer program application that is different than the first computer program application.

19. A computing device as recited in claim 17, wherein the instructions for specifying the packaging characteristics further comprising instructions for:
identifying a first subset of the files that are to be included in the presentation package and a second subset of the files that are to be included in a general distribution package, wherein the second subset of files is different than the first subset of flies.

20. A computing device as recited in claim 17, wherein the instructions for specifying the packaging characteristics further comprising instructions for:
selecting one or more options to identify how at least one subset of the files of the presentation package are packaged, the one or more options comprising stapling the at least one subset of files together and collating the at least one subset of files.

21. A computing device as recited in claim 17, wherein the instructions for specifying the packaging characteristics further comprising instructions for:
identifying a subset of files that are to be included in a general distribution package; and
indicating a number of copies to print with respect to the subset of the files that are to be included in the general distribution package.

22. A computing device as recited in claim 17, wherein the instructions for specifying the packaging characteristics further comprising instructions for:
indicating a number of copies to print with respect to at least a first subset of the files that are independent of at least a second subset of the files that are to be included in the presentation package.

23. A computing device as recited in claim 17, wherein the instructions for specifying the printing characteristics further comprising instructions for:
identifying a specific printer to print each of the files.

24. A computing device as recited in claim 17, wherein the instructions for specifying the printing characteristics further comprising instructions for:
indicating which of a plurality of print media supply bins are to be used by a printer to print individual ones of the files.

25. A user interface comprising:
a first area for adding a plurality of files to a presentation profile;
a second area for specifying a set of individual packaging characteristics with respect to individual each of the files;
a third area for indicating a set of individual printing characteristics with respect to individual each of the files; and
a fourth area for printing a presentation package including each of the files in the presentation profile in response to a single print request, the printing being based on the individual packaging characteristics and individual printing characteristics corresponding to each of the files.

26. A user interface as recited in claim 25, wherein a first subset of the files are generated using a first computer program application, and wherein a second subset of the files are generated using a second computer program application that is different than the first computer program application.

27. A user interface as recited in claim 25, wherein the second area for specifying the packaging characteristics further comprises:
a fifth area for identifying a first subset of the files that are to be included in the presentation package and a second subset of the files that are to be included in a general distribution package, wherein the second subset of files is different than the first subset of files.

28. A user interface as recited in claim 25, wherein the second area for specifying the packaging characteristics further comprises:
a fifth area for selecting one or more options to identify how at least one subset of the files of the presentation package are packaged, the one or more options comprising stapling the at least one subset of files together and collating the at least one subset of files.

29. A user interlace as recited in claim 25, wherein the second area for specifying the packaging characteristics further comprises:

a fifth area for identifying a subset of files that are to be included in a general distribution package and indicating a number of copies to print with respect to the subset of the files that are to be included in the general distribution package.

30. A user interface as recited in claim 25, wherein the second area for specifying the packaging characteristics further comprises:

a fifth area for indicating a number of copies to print with respect to at least a first subset of the files that are to be included in the presentation package.

31. A user interface as recited in claim 25, wherein the third area for specifying the printing characteristics further comprises:

a fifth area for identifying a specific printer to print each of the files.

32. A user interface as recited in claim 25, wherein the third area for specifying the printing characteristics further comprises:

a fifth area for indicating which of a plurality of print media supply bins are to be used by a printer to print individual ones of the files.

* * * * *

UNITED STATES PATENT AND TRADEMARK OFFICE
CERTIFICATE OF CORRECTION

PATENT NO.       : 7,551,316 B2
APPLICATION NO.  : 09/929430
DATED            : June 23, 2009
INVENTOR(S)      : Patricia S. Kruse It is certified that error appears in the above-identified patent and that said Letters Patent is hereby corrected as shown below:

In column 7, line 58, in Claim 1, delete "Characteristics" and insert -- characteristics --, therefor.

In column 8, line 11, in Claim 4, delete "comprises;" and insert -- comprises: --, therefor.

In column 9, line 62, in Claim 19, delete "flies." and insert -- files. --, therefor.

In column 10, line 65, in Claim 29, delete "interlace" and insert -- interface --, therefor.

Signed and Sealed this

Fourteenth Day of September, 2010

David J. Kappos
*Director of the United States Patent and Trademark Office*